United States Patent [19]

Stender

[11] Patent Number: 4,581,637

[45] Date of Patent: Apr. 8, 1986

[54] PIN DIODE MODULATOR

[75] Inventor: Robert A. Stender, Skokie, Ill.

[73] Assignee: Zenith Electronics Corporation, Glenview, Ill.

[21] Appl. No.: 512,294

[22] Filed: Jul. 8, 1983

[51] Int. Cl.$^4$ .................. H04K 1/02; H04N 7/167
[52] U.S. Cl. .................. 358/118; 358/114; 455/249
[58] Field of Search .................. 358/114, 118, 120; 455/249

[56] References Cited

U.S. PATENT DOCUMENTS

| | | | |
|---|---|---|---|
| 3,518,585 | 6/1970 | Wilcox | 455/249 |
| 4,019,160 | 4/1977 | Kam | 455/251 |
| 4,024,575 | 5/1977 | Harney et al. | 358/118 |
| 4,511,919 | 4/1985 | Forgey et al. | 358/120 |

Primary Examiner—S. C. Buczinski

[57] ABSTRACT

A sine wave modulator for decoding a sine wave encoded television signal includes a passive attenuation network comprising a pi-arrangement of PIN diodes. The encoded signal is supplied to the input port and the decoded signal is taken from the output port. A common bias arrangement for the series-shunt-connected PIN diodes results in the impedance of one PIN diode changing oppositely to the impedance of the other PIN diodes such that the impedance presented to the input and output ports remains substantially constant.

9 Claims, 2 Drawing Figures

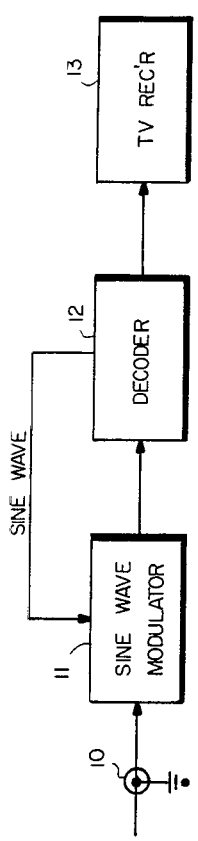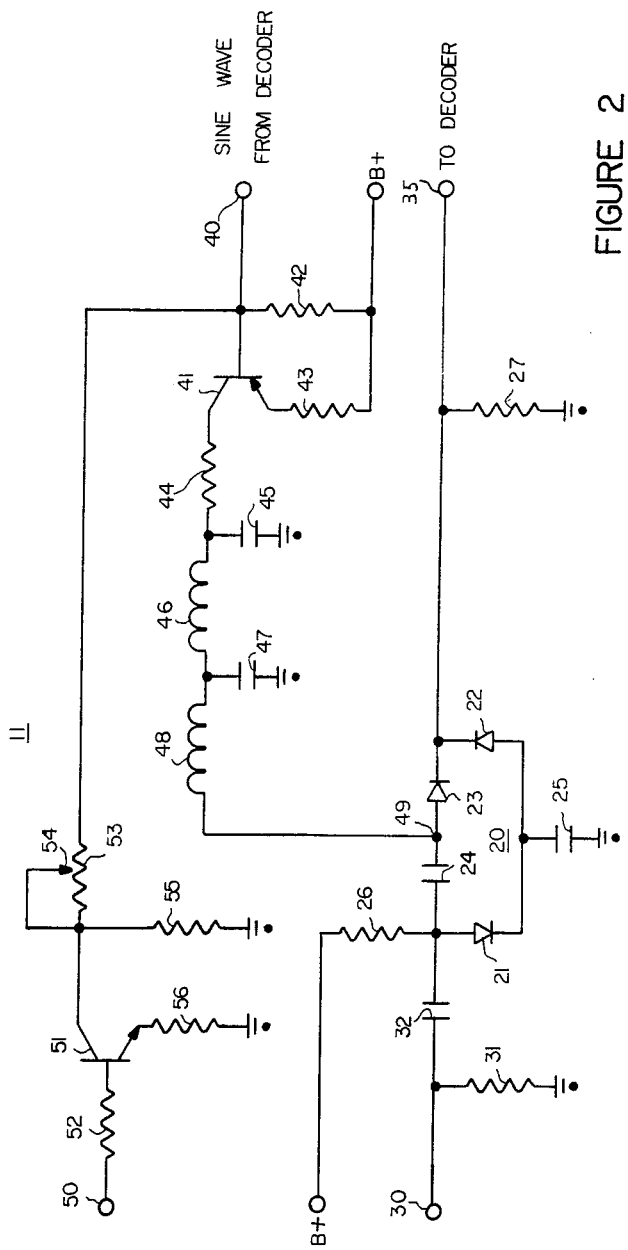

ns,637

PIN DIODE MODULATOR

BACKGROUND OF THE INVENTION AND PRIOR ART

This invention relates to decoders for encoded television signals and particularly concerns a modulator for decoding an RF-encoded television signal.

Subscription television broadcasts provide an encoded or encripted television signal that is only viewable in its entirety by subscribers having appropriate decoding apparatus for decoding the encoded signals. One conventional form of encoding amplitude modulates the video with a horizontal line frequency sine wave. This renders the video portion unviewable and also suppresses the horizontal synchronizing signals which contributes to a totally scrambled picture. The audio signal also may be encoded.

Apparatus for unscrambling such encoded television signals generally includes means for producing an appropriately-phased sine wave decoding signal from the received encoded signal and utilizing it to "multiply" the encoded television signal to thereby decode and reproduce the original video signal. One well known decoder circuit applies the recovered sine wave signal to the decoder automatic gain control circuit for varying the gain of the system as an opposite function of the amplitude of the encoding sine wave signal. The result is a decoded output signal. Other prior art circuits merely inject a decoding sine wave signal at the IF input, thus changing the IF signal level as an inverse function thereof, to produce a decoded output signal. Unfortunately, the prior art circuits are non-linear in their effect and result in an impedance mismatch in the IF circuit with a consequent degradation in video frequency response. Further, the decoding effect is generally not linear with changes in RF signal level and the output may vary by as much as 4 dB depending upon the input signal level. A further difficulty is that many of the encripted or encoded television signals are received via cable. Any attempt to decode such signals at RF frequencies must be concerned with impedance mismatches in the subscriber decoder which can result in unusual loading on the cable and undesired signals being backfed thereto.

OBJECTS OF THE INVENTION

Accordingly the principal object of the invention is to provide an improved decoder for decoding encoded television signals.

A further object of the invention is to provide a television decoder of constant impedance.

A still further object of the invention is to provide a television decoder that is linear in its operation.

SUMMARY OF THE INVENTION

In accordance with the invention, an encoded television signal is supplied to a modulator having an input port and an output port. A source of decoding signal, synchronized to the encoded television signal, varies the translation characteristic of the modulator as a function of the decoding signal for decoding the encoded television signal while presenting a substantially constant impedance to the input port and to the output port.

BRIEF DESCRIPTION OF THE DRAWINGS

Other objects and advantages of the invention will become apparent by reading the following description thereof in conjunction with the drawing in which:

FIG. 1 represents a simplified block diagram of a sine wave modulator and a decoder coupled to a television receiver in accordance with the invention; and FIG. 2 represents a schematic diagram of a sine wave modulator constructed in accordance with the invention.

DESCRIPTION OF THE PREFERRED EMBODIMENT

Referring to FIG. 1, a cable input terminal 10 couples a sine wave encoded cable-connected television signal to a sine wave modulator 11 which, in turn, supplies a decoder 12, the output of which is connected to a conventional television receiver 13. Decoder 12 includes a lead, labeled "sine wave", for feeding back a decoding signal to sine wave modulator 11 which, as will be described more fully, results in the amplitude encoded television signal being decoded before being supplied to television receiver 13. The decoding sine wave may be derived from amplitude modulation of the accompanying audio signal as shown in U.S. Pat. No. 4,024,575 or through the technique shown in co-pending application Ser. No. 413,003, filed 8-30-82, now U.S. Pat. No. 4,489,347.

In FIG. 2 the schematic diagram of sine wave modulator 11 is shown. The heart of the modulator includes a pi-connected attenuator 20 consisting of a plurality of PIN diodes 21, 22 and 23 connected in series and shunt paths between an input port 30 and an output port 35. Input port 30 is seen to correspond to cable terminal 10 of FIG. 1. One shunt path includes input port 30, an RF capacitor 32, PIN diode 21 and an RF capacitor 25 connected to ground. The series path includes input port 30, capacitor 32, an RF capacitor 24, PIN diode 23 and output port 35. The other shunt path includes grounded capacitor 25, PIN diode 22 and output port 35. A high value resistor 31 connects input port 30 to ground and serves to bleed off static on the cable. A source of B+ is connected, through a resistor 26, to the junction of capacitors 32 and 24. A bias resistor 27 is connected from output port 35 to ground and will be seen to be common to the series and the shunt paths for bias purposes. Junction 49 between capacitor 24 and PIN diode 23 is connected to a source of linear sine wave decoding signal.

The recovered sine wave decoding signal is supplied to a terminal 40 from the decoder and is applied to the base of a transistor 41 connected in an emitter follower arrangement where it is converted to a linear sine wave current for application to junction 49. As mentioned above, means for recovering this signal are well known in the art. The emitter of transistor 41 is connected to a source of B+ through a resistor 43. Its base is connected to B+ through a resistor 42 and to ground through a variable resistor 53 and a fixed resistor 55. The collector of transistor 41 is connected through a resistor 44 to a filter arrangement comprising a capacitor 45, a coil 46, a capacitor 47 and a coil 48. The output of the filter is connected to junction 49. A slider 54 on variable resistor 53 functions to change the effective value of its resistance.

A bias terminal 50 is connected through a resistor 52 to the base of a bias transistor 51, which has its emitter connected to ground through a resistor 56. The collector of transistor 51 is connected to the junction of variable resistor 53 and resistor 55.

Those skilled in the art will recognize that a PIN diode has the characteristic of functioning as a diode for DC and low frequency AC signals which constitute bias currents. In this connection, the standard 15.75 KHz horizontal scanning frequency is considered a low frequency AC signal. For RF frequencies however, PIN diodes appear as a resistance. As they are more heavily biased, that is driven more heavily conductive, their RF resistance decreases. These translation characteristics of the PIN diodes are utilized in the pi-attenuator network of the invention of modulating the sine wave amplitude-encoded television signal with an oppositely phased sine wave decoding signal to produce a decoded television signal at the output port of the attenuator while presenting a substantially constant impedance to input and output ports 30 and 35.

More particularly, a fixed DC bias is applied to PIN diodes 21 and 22 from B+ through resistor 26 and resistor 27 to ground. Resistor 27 is common to the series circuit including PIN diode 23 such that the voltage developed across resistor 27 as a result of decoding signal bias current flow through PIN diode 23, which is substantially greater than the bias current flow through PIN diodes 21 and 22, serves to vary the bias of PIN diodes 21 and 22 in an opposite sense to the bias of PIN diode 23. This action advantageously allows the translation characteristics of attenuator 20 to be controlled for decoding the encoded television signal while maintaining the input and output impedances of the attenuator at substantially constant levels.

In operation, the positive-going peaks of the linear sine wave decoding current, which coincide with the negative-going peaks of the amplitude modulation characterizing the encoded television signal, applied to junction 49 produce a maximum bias current through PIN diode 23 and a maximum voltage drop across resistor 27. As a result, the RF resistance characterizing series PIN diode 23 is a minimum while the RF resistance characterizing shunt PIN diodes 21 and 22 is a maximum. Furthermore, the ratio of the RF resistance of series PIN diode 23 to the RF resistance of either shunt PIN diode is at a minimum relative value. As a consequence, a minimum percentage of the encoded television signal applied to input port 30 is coupled through the two shunt paths so that a maximum signal level is recovered at output port 35. Now, as the level of the sine wave decoding current applied to junction 49 decreases, the bias through PIN diode 23 proportionately decreases reducing the voltage drop across resistor 27. As a result, the RF resistance of series PIN diode 23 increases while the RF resistance of shunt PIN diodes 21 and 22 decreases. The relative change in the RF resistance of PIN diodes 21-23 is such that the ratio of the RF resistance of series PIN diode 23 to either shunt PIN diode 21 or 22 increases in inverse relation to the decoding sine wave while maintaining substantially constant impedance levels as seen from the input and output of attenuator 20. Therefore, the attenuation or translation characteristic of the attenuator increases as the decoding sine wave decreases thereby proportionately attenuating the increasing amplitude modulation of the input signal to effect decoding thereof while maintaining substantially constant input and output attenuator impedance levels.

It will further be understood that the attenuation or translation characteristic of attenuator 20 will begin to decrease after the decoding sine wave passes through its negative peak and begins increasing. Decoding is thus effected by attenuating the decreasing input signal modulation to a proportionately lesser degree while maintaining substantially constant input and output attenuator impedance levels.

Therefore, to recapitulate, the attenuation or translation characteristic of attenuator 20 is varied in inverse relation to the decoding sine wave at junction 49 or, stated otherwise, in direct relation to the amplitude modulation of the encoded input signal to effect decoding thereof while maintaining substantially constant input and output attenuator impedance levels.

When a sine wave encoded signal is not being received, an appropriate signal is applied from the decoder to terminal 50 to disable the modulator. In that event an increased potential is applied to terminal 50 which drives transistor 51 conductive and, in turn, drives sine wave transistor 41 heavily conductive. The result is that PIN diode 23 is driven into saturation, simultaneously reducing bias current flow through PIN diodes 21 and 22. This has the effect of allowing signal transfer between input port 30 and output port 35 with minimum insertion loss.

The presence of the filter comprising capacitors 45 and 47, and coils 46 and 48 permits the large bias current swing required for proper operation of PIN diode 23 while maintaining high impedance isolation between transistor 41 and the RF signal path through the attenuator network. For optimum decoding, variable resistor 53 is adjusted to set the PIN diode modulator bias point to produce approximately 4 dB attenuation between the input port and the output port. The modulator is allowed to swing ±3 dB, thus retaining 1 dB of margin to eliminate the possibility of modulation compression with the normal 6 dB encoding levels.

What has been described is a novel sine wave modulator utilizing PIN diodes for maintaining substantially constant input and output port impedances of the modulator. It is recognized that numerous modifications and changes in the described embodiment of the invention will be apparent to those skilled in the art without departing from the true spirit and scope thereof. The invention is to be limited only as defined in the claims.

What is claimed is:

1. In combination for use with an encoded television signal;
   a source of decoding signals synchronized with said encoded television signal;
   a modulator having an input port and an output port, said modulator comprising a pi-connected network including a plurality of PIN diodes, one of said PIN diodes being connected in a series path between said input port and said output port and another of said PIN diodes being connected in a shunt path;
   means for biasing said PIN diodes such that the impedance of said series path increases as the impedance of said shunt path decreases;
   means supplying said encoded television signal to said input port; and
   means supplying said decoding signal as a variable bias to said modulator for varying the translation characteristic of said modulator between said input port and said output port as a function of said decoding signal for decoding said encoded television signal, whereby said modulator presents a substantially constant impedance to said input port and to said output port at all times.

2. The combination of claim 1 wherein said series and shunt paths are connected in a bias circuit such that bias current affects the diodes in both said paths.

3. The combination of claim 2 wherein said decoding signal comprises a sine wave supplied to said one PIN diode to affect the bias on all said diodes.

4. The combination of claim 3 wherein said bias current and said decoding signal flow through a common bias resistor.

5. The combination of claim 4 including a transistor for supplying a linear sine wave decoding current signal to said attenuation network, and wherein said attenuation network imposes a nominal 4 to 4.5 dB attenuation loss between said input port and said output port.

6. The combination of claim 5 including means for driving said transistor into heavy conduction when a non-encoded television signal is being received, to heavily forward bias said one PIN diode and minimize the insertion loss of said attenuator network between said input port and said output port.

7. For use in decoding a cable-connected encoded television signal:
 a source of decoding signal synchronized with said encoded television signal;
 a modulator, including a pi-connected attenuator network, having an input port for receiving said encoded television signal and an output port for delivering a decoded television signal and a ground terminal;
 said network including a plurality of PIN diodes connected in a series path between said input port and said output port and in shunt paths between said input port and said output port and said ground terminal respectively;
 a common bias resistor affecting the bias applied to the PIN diodes in all said paths; and
 means supplying a decoding signal to change the bias current in the PIN diode in said series path and to develop a voltage across said common bias resistor to oppositely change the bias on the PIN diodes in said shunt paths to decode said encoded television signal while maintaining a substantially constant impedance between said input port and said output port.

8. The elements set forth in claim 7, wherein said decoding signal is a sine wave.

9. The elements set forth in claim 8, further including means responsive to a non-encoded signal being received for saturating the PIN diode in said series path to present minimum impedance to RF signal transfer between said input port and said output port.

* * * * *